(12) United States Patent
Zhao et al.

(10) Patent No.: US 12,503,067 B2
(45) Date of Patent: Dec. 23, 2025

(54) DRIVER CONTROLLER CONTROL CIRCUIT WITH MECHANICAL INTERLOCK STRUCTURE OF ELECTROMAGNETIC VALVES

(71) Applicant: CRRC Nanjing Puzhen Co., Ltd., Nanjing (CN)

(72) Inventors: Hong Zhao, Nanjing (CN); Zhi Chen, Nanjing (CN); Jianhua Yong, Nanjing (CN); Haixia Huang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 145 days.

(21) Appl. No.: 18/559,834

(22) PCT Filed: Sep. 29, 2022

(86) PCT No.: PCT/CN2022/122359
§ 371 (c)(1),
(2) Date: Nov. 9, 2023

(87) PCT Pub. No.: WO2024/016477
PCT Pub. Date: Jan. 25, 2024

(65) Prior Publication Data
US 2025/0083624 A1  Mar. 13, 2025

(30) Foreign Application Priority Data
Jul. 19, 2022 (CN) .......................... 202210849095.9

(51) Int. Cl.
*H01H 47/00* (2006.01)
*B60R 16/023* (2006.01)
*H01F 7/06* (2006.01)

(52) U.S. Cl.
CPC ......... *B60R 16/0231* (2013.01); *H01F 7/064* (2013.01)

(58) Field of Classification Search
None
See application file for complete search history.

(56) References Cited

U.S. PATENT DOCUMENTS 3,623,777 A * 11/1971 Sarbach .................. B60T 17/20
303/20
4,955,304 A * 9/1990 Spenk ..................... B61L 3/127
104/295

(Continued)

FOREIGN PATENT DOCUMENTS

CN     102372007 A    3/2012
CN     103847748 A    6/2014

(Continued)

*Primary Examiner* — Stephen W Jackson
(74) *Attorney, Agent, or Firm* — Bayramoglu Law Offices LLC

(57) ABSTRACT

A driver controller control circuit with a mechanical interlocking structure of electromagnetic valves includes a local cab control circuit, a remote cab control circuit and an intermediate garage. The local cab control circuit includes a local driver controller breaker, a local key bypass switch, a local driver controller key limit switch, a local electromagnetic valve, a local driver controller directional 0-position limit switch, a local cab key relay and a local driver controller activation relay. The remote cab control circuit includes a remote driver controller breaker, a remote key bypass switch, a remote driver controller key limit switch, a remote electromagnetic valve, a remote driver controller directional 0-position limit switch, a remote driver controller key relay and a remote cab activation relay. The driver controller control circuit ensures the interlocking function of the driver controllers at both ends, and reduces complexity of circuit design and occurrence of failure rate.

9 Claims, 2 Drawing Sheets

(56) References Cited

U.S. PATENT DOCUMENTS 5,651,426 A * 7/1997 Bittar .................... B66B 1/2491
  187/382
2018/0190443 A1 7/2018 Niu et al.

FOREIGN PATENT DOCUMENTS

CN    113147800 A    7/2021
CN    115123317 A    9/2022

* cited by examiner

DRIVER CONTROLLER CONTROL CIRCUIT WITH MECHANICAL INTERLOCK STRUCTURE OF ELECTROMAGNETIC VALVES

CROSS REFERENCE TO THE RELATED APPLICATIONS

This application is the national phase entry of International Application No. PCT/CN2022/122359, filed on Sep. 29, 2022, which is based upon and claims priority to Chinese Patent Application No. 202210849095.9, filed on Jul. 19, 2022, the entire contents of which are incorporated herein by reference.

TECHNICAL FIELD

The present invention relates to the field of driver controller control technology, and in particular to a driver controller control circuit with a mechanical interlock structure of electromagnetic valves.

BACKGROUND

At present, the manual driving of metro trains needs to be controlled by the driver controller. In the process of train operation, only one end of the driver controller is required to output instructions effectively, and the driver controller of the cab the other end is not allowed to participate in vehicle control. The traditional driver controller of the metro train is a pure mechanical mechanism, with no electromagnetic valve set inside, and the two driver controllers do not affect each other. When the two driver controllers both set the key to the "ON" position, the driver is restricted by the driving rules or the electrical interlock circuit is added to the output command of the driver controller key, so as to avoid the driver cabs at both ends being activated simultaneously or the driver controllers at both ends outputting the control commands at the same time.

The existing driver controllers are basically controlled by this electrical interlock. As shown in FIG. 2, the KEY of the driver controller has two gears: ON and OFF, with the electrical interlock between two cab keys. The driver may turn ON the cab KEY at either end, and the cab is selected. When the remote cab KLSR relay is energized, its normally closed contact is switched off, and the remote cab key relay is interlocked. Even if the remote key is in the ON position, the remote key relay will not be activated.

However, the driver controller with a purely mechanical structure can only operate the driver controller at one end when the driver is restricted by the driving rules, which cannot fundamentally avoid human misoperation. However, in the existing electrical interlocking solution of the driver controller, it needs to consider the interlocking logic from the key of the driver controller, power supply and output instructions. The circuit design is relatively complex and not fully considered in the initial design, which may lead to the rectification of a problem and changes in the later production and waste of manpower and material resources.

In view of the problems in the related art, no effective solution has been proposed.

SUMMARY

In response to the problems of the related art, the present invention proposes a driver controller control circuit with a mechanical interlocking structure of electromagnetic valves to overcome the above-mentioned technical problems of the related art.

Therefore, the specific technical solution adopted by the invention is as follows.

A driver controller control circuit with a mechanical interlock structure of electromagnetic valves includes a local cab control circuit, a remote cab control circuit and an intermediate garage, wherein the local cab control circuit and the remote cab control circuit are connected via the intermediate garage.

Furthermore, the local cab control circuit includes a local driver controller breaker MCCB1, a local key bypass switch KBS1, a local driver controller key limit switch KS1, a local electromagnetic valve Y1, a local driver controller directional 0-position limit switch S1, a local driver controller key relay KSR1 and a local cab activation relay COR1.

Furthermore, one end of the local driver controller breaker MCCB1 is connected to a train positive line 110V+; the other end of the local driver controller breaker MCCB1 is sequentially connected to a contact 14 and a contact 22 of the local key bypass switch KBS1; a contact 13 of the local key bypass switch KBS1 is connected to the contact 22 of the local driver controller key limit switch KS1; a contact 21 of the local key bypass switch KBS1 is respectively connected to a contact 21 and a contact 13 of the local driver controller key limit switch KS1; a contact 14 of the local driver controller key limit switch KS1 is connected to a point location of a coil X1 of the local driver controller key relay KSR1; one end of a movable contact of the local driver controller key relay KSR1 is connected to a contact 22 of the local key bypass switch KBS1; the other end of the movable contact of the local driver controller key relay KSR1 is connected to a point location of a coil X1 of the local cab activation relay COR1; the point location of the coil X2 of the local cab activation relay COR1, the point location of the coil X2 of the local driver controller key relay KSR1 and a contact 22 of a local driver controller directional 0-position limit switch S1 are respectively connected to a train negative line 110V−; and a contact 21 of the local driver controller directional 0-position limit switch S1 is connected to a contact 2 of the local electromagnetic valve Y1.

Further, the remote cab control circuit includes a remote driver controller breaker MCCB2, a remote key bypass switch KBS2, a remote driver controller key limit switch KS2, a remote electromagnetic valve Y2, a remote driver controller directional 0-position limit switch S2, a remote driver controller key relay KSR2 and a remote driver controller activation relay COR2.

Furthermore, one end of the remote driver controller breaker MCCB2 is connected to the train positive line 110V+; the other end of the remote driver controller breaker MCCB2 is successively connected to a contact 13 and a contact 21 of the remote key bypass switch KBS2; a contact 14 of the remote key bypass switch KBS2 is respectively connected to a contact 21 of the remote driver controller key limit switch KS2 and a contact 1 of the local electromagnetic valve Y1; a contact 22 of the remote key bypass switch KBS2 is respectively connected to a contact 22 and a contact 14 of the remote driver controller key limit switch KS2; a contact 13 of the remote driver controller key limit switch KS2 is connected to a point location of a coil X1 of the remote driver controller key relay KSR2; one end of a movable contact of the remote driver controller key relay KSR2 is connected to a contact 22 of the remote key bypass switch KBS2; the other end of the movable contact of the remote driver controller key relay KSR2 is connected to a point location of a coil X1 of the remote cab activation relay COR2; a point location of the coil X2 of the remote cab activation relay COR2, a point location of the coil X2 of the remote driver controller key relay KSR2 and a contact 21 of the remote driver controller directional 0-position limit switch S2 are respectively connected to the train negative line 110V−; a contact 22 of the remote driver controller directional 0-position limit switch S2 is connected to a contact 2 of the remote electromagnetic valve Y2; and a contact 1 of the remote electromagnetic valve Y2 is respectively connected to a contact 13 of the remote key bypass switch KBS2 and a contact 22 of the local driver controller key limit switch KS1.

Furthermore, when a key in the local driver controller key limit switch KS1 is turned to an ON position, the local driver controller key limit switch KS1 is triggered to operate, the contacts 13-14 are switched on, the contacts 21-22 are switched off; the local driver controller key relay KSR1 is controlled by the contacts 13-14 of the local driver controller key limit switch KS1; and the local driver controller key relay KSR1 is energized, the local driver controller key relay KSR1 drives the local cab activation relay COR1 to be energized, and a local cab is activated.

Furthermore, when a key in the remote driver controller key limit switch KS2 is turned to an ON position, the remote driver controller key limit switch KS2 is triggered to operate, the contacts 13-14 are switched on, the contacts 21-22 are switched off, the remote driver controller key relay KSR2 is controlled by the contacts 13-14 of the remote driver controller key limit switch KS2; and the remote driver controller key relay KSR2 is energized, the remote driver controller key relay KSR2 drives the remote cab activation relay COR2 to be energized, and a remote cab is activated.

Furthermore, when the contacts 21-22 of the key limit switch KS1 of the local driver controller are switched off, another unit key signal controlled by the contacts 21-22 of the local driver controller key limit switch KS1 fails, the electromagnetic valve circuit in the remote cab is off, and the remote electromagnetic valve Y2 loses power, so that the remote driver controller is stuck and it cannot rotate the key; and when the contacts 13-14 of the remote driver controller key limit switch KS2 are switched off, the remote driver controller key relay KSR2 controlled by the contacts 13-14 of the remote driver controller key limit switch KS2 is not energized, and the remote cab activates the remote cab activation relay COR2 which is not energized, so as to avoid both ends of the cab being activated at the same time or both ends of the driver controller outputting a control instruction at the same time.

Furthermore, when the keys in the local driver controller key limit switch KS1 and the remote driver controller key limit switch KS2 are turned to the OFF position, the local driver controller key limit switch KS1 and the remote driver controller key limit switch KS2 are not triggered, the contacts 13-14 are switched off, and the contacts 21-22 are switched on.

Furthermore, when a direction handle is in a 0 position, the local driver controller directional 0-position limit switch S1 and the remote driver controller directional 0-position limit switch S2 will not be triggered, the contacts 13-14 are switched off, and the contacts 21-22 are switched on.

The invention has the following beneficial effects.

1) By providing an electromagnetic valve inside the driver controller, the key of the driver controller can be operated when the electromagnetic valve is energized, and the key of the driver controller is prohibited from the operation when the electric valve is de-energized. An external logic control circuit is added to control the energizing of the internal electromagnetic valve. The key switch has two gears of "on" and "off". On the premise that there is no cab activation and the train has woken up, the driver controller electromagnetic valves at both ends are energized, and the key switches of both cabs are released. When the driver selects the cab key switch at either end to turn "on", the driver controller electromagnetic valve of the present cab is energized, and the remote driver controller electromagnetic valve is de-energized, so that the remote driver controller is locked and it cannot rotate the key, thereby ensuring that only one end of the cab can be activated at the same time, and the driver controller at one end participates in vehicle control. Furthermore, it is possible to effectively avoid the risk of accidental operation caused by both cabs being activated at the same time or both driver controllers outputting control instructions at the same time.

2) In the design of present invention, it cooperates with a simple and reliable control circuit 2. means of a driver controller with a built-in electromagnetic valve structure, i.e., ensuring the interlocking function of the driver controllers at both ends, at the same time reducing the complexity of circuit design and the occurrence of failure rate, and increasing the reliability of operation of the driver controller.

BRIEF DESCRIPTION OF THE DRAWINGS

In order to more clearly describe the technical solutions in the embodiments of the invention or the prior art, the drawings to be used in the description of the embodiments will be briefly introduced below. It will be apparent to those skilled in the art that the drawings in the following description are only some of the invention, and that other drawings may be obtained from the drawings without any creative works.

DETAILED DESCRIPTION OF THE EMBODIMENTS

Figure 1:
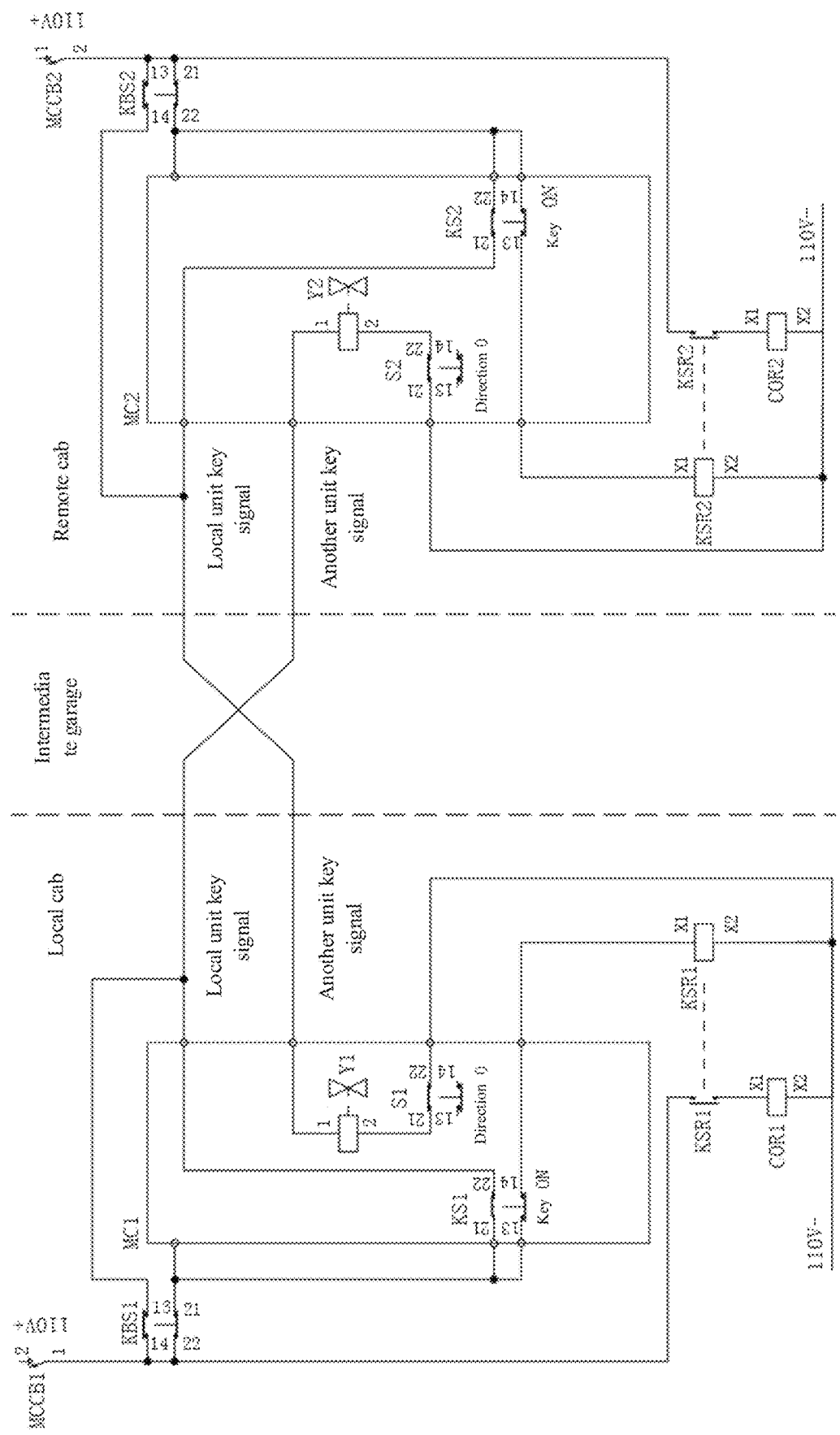
FIG. 1 is a circuit diagram of a driver controller control circuit with a mechanical interlock structure of electromagnetic valves according to an embodiment of the present invention.
Figure 2:
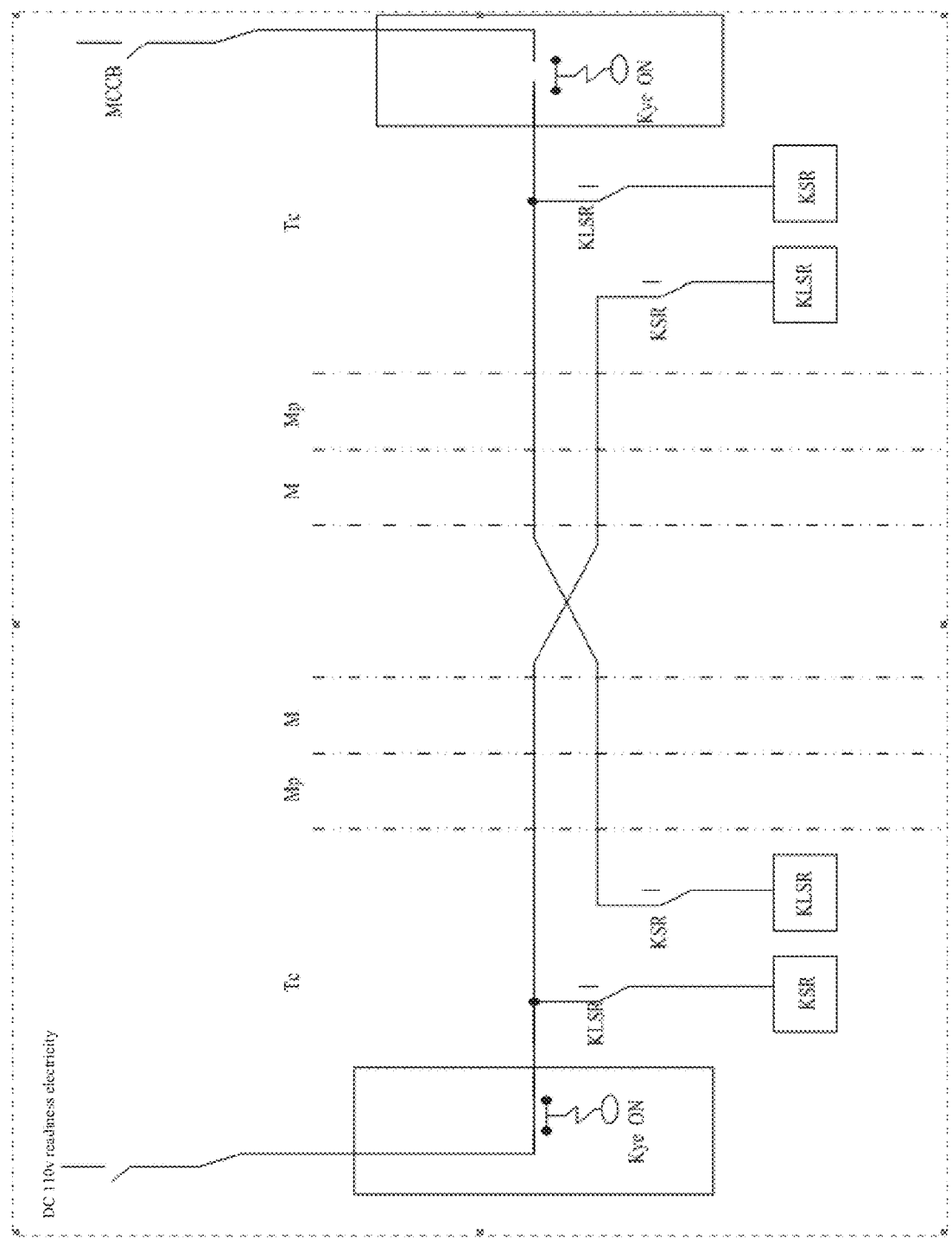
FIG. 2 is an output circuit diagram of an electrical interlock of a driver controller in the prior art.

To further illustrate the embodiments, the present invention is provided with the accompanying drawings, which constitute a part of this disclosure and illustrate the embodiments and, together with the description, serve to explain the principles of operation of the embodiments. Other possible embodiments and advantages of the present invention will be readily apparent to those of ordinary skill in the art from the following detailed description, wherein elements are not drawn to scale and wherein like reference numerals are used to refer to like elements throughout.

According to an embodiment of the present invention, a driver controller control circuit with a mechanical interlocking structure of electromagnetic valves is provided. In the present invention, the driver controller is composed of a key, a direction handle and a main control handle. The direction handle and the main control handle are required to operate effectively when the key is activated. When the key is in a closed position, the direction handle and the main control handle cannot operate, and both default to a 0 position. An electromagnetic valve is disposed inside the driver controller, and the electromagnetic valve is powered to allow the key to be operated.

The present invention will now be described in further detail with reference to the accompanying drawings and detailed description. As shown in FIG. 1, a driver control circuit with a mechanical interlocking structure of electromagnetic valves according to an embodiment of the present invention includes a local cab control circuit, a remote cab control circuit and an intermediate garage, wherein the local cab control circuit and the remote cab control circuit are connected via the intermediate garage.

Herein, the local cab control circuit includes a local driver controller breaker MCCB1, a local key bypass switch KBS1, a local driver controller key limit switch KS1, a local electromagnetic valve Y1, a local driver controller directional 0-position limit switch S1, a local driver controller key relay KSR1 and a local cab activation relay COR1.

One end of the local driver controller breaker MCCB1 is connected to a train positive line 110V+; the other end of the local driver controller breaker MCCB1 is sequentially connected to a contact 14 and a contact 22 of the local key bypass switch KBS1; a contact 13 of the local key bypass switch KBS1 is connected to the contact 22 of the local driver controller key limit switch KS1; a contact 21 of the local key bypass switch KBS1 is respectively connected to a contact 21 and a contact 13 of the local driver controller key limit switch KS1; a contact 14 of the local driver controller key limit switch KS1 is connected to a point location of a coil X1 of the local driver controller key relay KSR1; one end of a movable contact of the local driver controller key relay KSR1 is connected to a contact 22 of the local key bypass switch KBS1; the other end of the movable contact of the local driver controller key relay KSR1 is connected to a point location of a coil X1 of the local cab activation relay COR1; the point location of the coil X2 of the local cab activation relay COR1, the point location of the coil X2 of the local driver controller key relay KSR1 and a contact 22 of a local driver controller directional 0-position limit switch S1 are respectively connected to a train negative line 110V−; and a contact 21 of the local driver controller directional 0-position limit switch S1 is connected to a contact 2 of the local electromagnetic valve Y1.

Herein, the remote cab control circuit includes a remote driver controller breaker MCCB2, a remote key bypass switch KBS2, a remote driver controller key limit switch KS2, a remote electromagnetic valve Y2, a remote driver controller directional 0-position limit switch S2, a remote driver controller key relay KSR2 and a remote driver controller activation relay COR2.

One end of the remote driver controller breaker MCCB2 is connected to the train positive line 110V+; the other end of the remote driver controller breaker (MCCB2) is successively connected to a contact 13 and a contact 21 of the remote key bypass switch KBS2; a contact 14 of the remote key bypass switch KBS2 is respectively connected to a contact 21 of the remote driver controller key limit switch KS2 and a contact 1 of the local electromagnetic valve Y1; a contact 22 of the remote key bypass switch KBS2 is respectively connected to a contact 22 and a contact 14 of the remote driver controller key limit switch KS2; a contact 13 of the remote driver controller key limit switch KS2 is connected to a static contact X1 of the remote driver controller key relay KSR2; one end of a movable contact of the remote driver controller key relay KSR2 is connected to a contact 22 of the remote key bypass switch KBS2; the other end of the movable contact of the remote driver controller key relay KSR2 is connected to a point location of a coil X1 of the remote cab activation relay COR2; a point location of the coil X2 of the remote cab activation relay COR2, a point location of the coil X2 of the remote driver controller key relay KSR2 and a contact 21 of the remote driver controller directional 0-position limit switch S2 are respectively connected to the train negative line 110V−1; a contact 22 of the remote driver controller directional 0-position limit switch S2 is connected to a contact 2 of the remote electromagnetic valve Y2; and a contact 1 of the remote electromagnetic valve Y2 is respectively connected to a contact 13 of the remote key bypass switch KBS2 and a contact 22 of the local driver controller key limit switch KS1.

In this embodiment, when the key is turned to the "ON" position, the key limit switch KS1/KS2 is triggered to operate, the contacts 13-14 are switched on, and the contacts 21-22 are switched off. When the key is turned to the "OFF" position, the key limit switches KS1/KS2 are not triggered, the contacts 13-14 are switched off, and the contacts 21-22 are switched on. When the directional handle is in the 0 position in the directional 0-position limit switch S1/S2, the directional 0-position limit switch S1/S2 will not be triggered, the contacts 13-14 are open and the contacts 21-22 are switched on.

With no cab activation and the train awake, the 110V+ power signal is active, the key bypass switch KBS1/2 is normally in the normal position, and the contacts 21-22 of the switches KBS1/2 are switched on. When the keys at both ends is at the "off" position, the limit switch KS1/2 of the keys at both ends is not triggered, and the contacts 21-22 of KS1/2 are switched on. The direction handled of the keys at both ends default to be at the 0 position affected by the key, the driver controller directional 0-position limit switch S1/2 at both ends is not triggered, and the contacts 21-22 of S1/2 are switched on. The key signal of the present unit crosses the key signal of the other unit. The electromagnetic valve loops are conductive under the control of the contacts 21-22 of the limit switch KS1 of the key at both ends and the contacts 21-22 of the local driver controller directional 0-position limit switch S1/2, and the electromagnetic valves at both ends are energized. The key switches of both cabs are released and both keys may be operated.

When the driver selects the cab key switch at either end to turn "on", the local driver controller key limit switch KS1 is operated, the KS1 contacts 13-14 are switched on and 21-22 are switched off. The local driver controller key relay KSR1 is controlled by the KS1 contacts 13-14, and the KSR1 is energized, the KSR1 drives the local cab activation relay COR1, and the local cab is activated. When the contacts 21-22 of the key limit switch KS1 of the local driver controller control unit are are switched off, the key signal of the present unit controlled by the KS1 contacts 21-22 is disabled, the electromagnetic valve loop of the driver controller control unit at the remote cab is disconnected, and the electromagnetic valve of the remote driver controller control unit is de-energized, so that the remote driver controller is locked and it cannot rotate the key. The contacts 13-14 of the remote driver controller key limit switch KS2 are switched off, and the remote driver controller key relay KSR2 controlled by the KS2 contacts 13-14 shall not be energized, and the remote driver controller activation relay COR2 shall not be energized, so as to avoid both ends of the cab being activated at the same time or both ends of the driver controller outputting a control instruction at the same time.

An additional key bypass control circuit is added to the circuit to prevent a situation where the key on one end is already in the "on" position but cannot be restored to the "off" position. When it is necessary to replace the cab selection, it is found that the cab key at the selected end cannot return to the "off" position. The cab key bypass switch KBS1 at the selected end can be operated first to the "bypass" position. The contacts 21-22 at the selected end KBS1 are switched off. The local driver controller key relay KSR1 is de-energized. The cab selection at the local end is canceled. The contacts 13-14 at the selected end KBS1 are switched on. The local unit key signal train line is powered on at the selected end. Another unit key signal at the remote end cab is active. The contacts 21-22 of the remote driver controller directional 0-position limit switch S2 locked by the key switch are switched off. The electromagnetic valve loop of the remote driver controller is conductive, and the electromagnetic valve is energized. The remote cab key is released, and the remote driver controller key can act to activate the remote cab.

In summary, according to the above-mentioned technical solution of the present invention, by providing the electromagnetic valve inside the driver controller, the key of the driver controller can be operated when the electromagnetic valve is energized, and the key of the driver controller is prohibited from being operated when the electromagnetic valve is energized. An external logic control circuit is added to control the internal electromagnetic valve to be energized. The key switch has two gears of "on" and "off". On the premise that there is no cab activation and the train has woken up, the driver controller electromagnetic valves at both ends are energized, and the key switches of both cabs are released. When the driver selects the cab key switch at either end to turn "on", the driver controller electromagnetic valve of the present cab is energized, and the remote driver controller electromagnetic valve is de-energized, so that the remote driver controller is locked and it cannot rotate the key, thereby ensuring that only one end of the cab can be activated at the same time, and the driver controller at one end participates in vehicle control. Furthermore, it is possible to effectively avoid the risk of accidental operation caused by both cabs being activated at the same time or both driver controllers outputting control instructions at the same time.

In addition, in the design of present invention, it cooperates with a simple and reliable control circuit 2. means of a driver controller with a built-in electromagnetic valve structure, i.e., ensuring the interlocking function of the driver controllers at both ends, at the same time reducing the complexity of circuit design and the occurrence of failure rate, and increasing the reliability of operation of the driver controller.

The above mentioned are only preferred embodiments of the invention and is not intended to limit the invention. Any modification, equivalent substitution and improvement made within the spirit and principles of the invention shall be covered by the protection of the invention.

What is claimed is:

1. A driver controller control circuit with a mechanical interlock structure of electromagnetic valves, comprising a local cab control circuit, a remote cab control circuit and an intermediate garage, wherein the local cab control circuit and the remote cab control circuit are connected via the intermediate garage, and the local cab control circuit comprises a local driver controller breaker MCCB1, a local key bypass switch KBS1, a local driver controller key limit switch KS1, a local electromagnetic valve Y1, a local driver controller directional 0-position limit switch S1, a local driver controller key relay KSR1 and a local cab activation relay COR1.

2. The driver controller control circuit with the mechanical interlock structure of electromagnetic valves according to claim 1, wherein a first end of the local driver controller breaker MCCB1 is connected to a train positive line 110V+; a second end of the local driver controller breaker MCCB1 is sequentially connected to a contact 14 and a contact 22 of the local key bypass switch KBS1; a contact 13 of the local key bypass switch KBS1 is connected to a contact 22 of the local driver controller key limit switch KS1; a contact 21 of the local key bypass switch KBS1 is respectively connected to a contact 21 and a contact 13 of the local driver controller key limit switch KS1; a contact 14 of the local driver controller key limit switch KS1 is connected to a point location of a coil X1 of the local driver controller key relay KSR1;

a first end of a movable contact of the local driver controller key relay KSR1 is connected to the contact 22 of the local key bypass switch KBS1; a second end of the movable contact of the local driver controller key relay KSR1 is connected to a point location of a coil X1 of the local cab activation relay COR1; a point location of a coil X2 of the local cab activation relay COR1, a point location of a coil X2 of the local driver controller key relay KSR1 and a contact 22 of the local driver controller directional 0-position limit switch S1 are respectively connected to a train negative line 110V−; and a contact 21 of the local driver controller directional 0-position limit switch S1 is connected to a contact 2 of the local electromagnetic valve Y1.

3. The driver controller control circuit with the mechanical interlock structure of electromagnetic valves according to claim 2 wherein the remote cab control circuit comprises a remote driver controller breaker MCCB2, a remote key bypass switch KBS2, a remote driver controller key limit switch KS2, a remote electromagnetic valve Y2, a remote driver controller directional 0-position limit switch S2, a remote driver controller key relay KSR2 and a remote driver controller activation relay COR2.

4. The driver controller control circuit with the mechanical interlock structure of electromagnetic valves according to claim 3, wherein a first end of the remote driver controller breaker MCCB2 is connected to the train positive line 110V+; a second end of the remote driver controller breaker MCCB2 is successively connected to a contact 13 and a contact 21 of the remote key bypass switch KBS2; a contact 14 of the remote key bypass switch KBS2 is respectively connected to a contact 21 of the remote driver controller key limit switch KS2 and a contact 1 of the local electromagnetic valve Y1; a contact 22 of the remote key bypass switch KBS2 is respectively connected to a contact 22 and a contact 14 of the remote driver controller key limit switch KS2; a contact 13 of the remote driver controller key limit switch KS2 is connected to a point location of a coil X1 of the remote driver controller key relay KSR2;

a first end of a movable contact of the remote driver controller key relay KSR2 is connected to a contact 22 of the remote key bypass switch KBS2; a second end of the movable contact of the remote driver controller key relay KSR2 is connected to a point location of a coil X1 of the remote cab activation relay COR2; a point location of a coil X2 of the remote cab activation relay COR2, a point location of a coil X2 of the remote driver controller key relay KSR2 and a contact 22 of the remote driver controller directional 0-position limit switch S2 are respectively connected to the train negative line 110V−; the contact 22 of the remote driver controller directional 0-position limit switch S2 is connected to a contact 2 of the remote electromagnetic valve Y2; and a contact 1 of the remote electromagnetic valve Y2 is respectively connected to a contact 13 of the remote key bypass switch KBS2 and a contact 22 of the local driver controller key limit switch KS1.

5. The driver controller control circuit with the mechanical interlock structure of electromagnetic valves according to claim 4, wherein when a key in the local driver controller key limit switch KS1 is turned to an ON position, the local driver controller key limit switch KS1 is triggered to operate, the contacts 13-14 are switched on, the contacts 21-22 are switched off; the local driver controller key relay KSR1 is controlled by the contacts 13-14 of the local driver controller key limit switch KS1; and the local driver controller key relay KSR1 is energized, the local driver controller key relay KSR1 drives the local cab activation relay COR1 to be energized, and a local cab is activated.

6. The driver controller control circuit with the mechanical interlock structure of electromagnetic valves according to claim 5, wherein when a key in the remote driver controller key limit switch KS2 is turned to an ON position, the remote driver controller key limit switch KS2 is triggered to operate, the contacts 13-14 are switched on, the contacts 21-22 are switched off; the remote driver controller key relay KSR2 is controlled by the contacts 13-14 of the remote driver controller key limit switch KS2; and the remote driver controller key relay KSR2 is energized, the remote driver controller key relay KSR2 drives the remote cab activation relay COR2 to be energized, and a remote cab is activated.

7. The driver controller control circuit with the mechanical interlock structure of electromagnetic valves according to claim 6, wherein when the contacts 21-22 of the local driver controller key limit switch KS1 are switched off, another unit key signal controlled by the contacts 21-22 of the local driver controller key limit switch KS1 fails, the electromagnetic valve circuit in the remote cab is off, and the remote electromagnetic valve Y2 loses power, so that the remote driver controller is stuck and does not rotate the key; and when the contacts 13-14 of the remote driver controller key limit switch KS2 are switched off, the remote driver controller key relay KSR2 controlled by the contacts 13-14 of the remote driver controller key limit switch KS2 is not energized, and the remote cab activates the remote cab activation relay COR2 which is not energized, so as to avoid both ends of the cab being activated at the same time or both ends of the driver controller outputting a control instruction at the same time.

8. The driver controller control circuit with the mechanical interlock structure of electromagnetic valves according to claim 4, wherein when the keys in the local driver controller key limit switch KS1 and the remote driver controller key limit switch KS2 are turned to an OFF position, the local driver controller key limit switch KS1 and the remote driver controller key limit switch KS2 are not triggered, the contacts 13-14 are switched off, and the contacts 21-22 are switched on.

9. The driver controller control circuit with the mechanical interlock structure of electromagnetic valves according to claim 4, wherein when a direction handle is in a 0 position, the local driver controller directional 0-position limit switch S1 and the remote driver controller directional 0-position limit switch S2 are not triggered, the contacts 13-14 are switched off, and the contacts 21-22 are switched on.

* * * * *